Nov. 8, 1932.     R. N. RIBLET     1,886,588
TRANSFER TRUCK
Filed Feb. 29, 1932     4 Sheets-Sheet 1
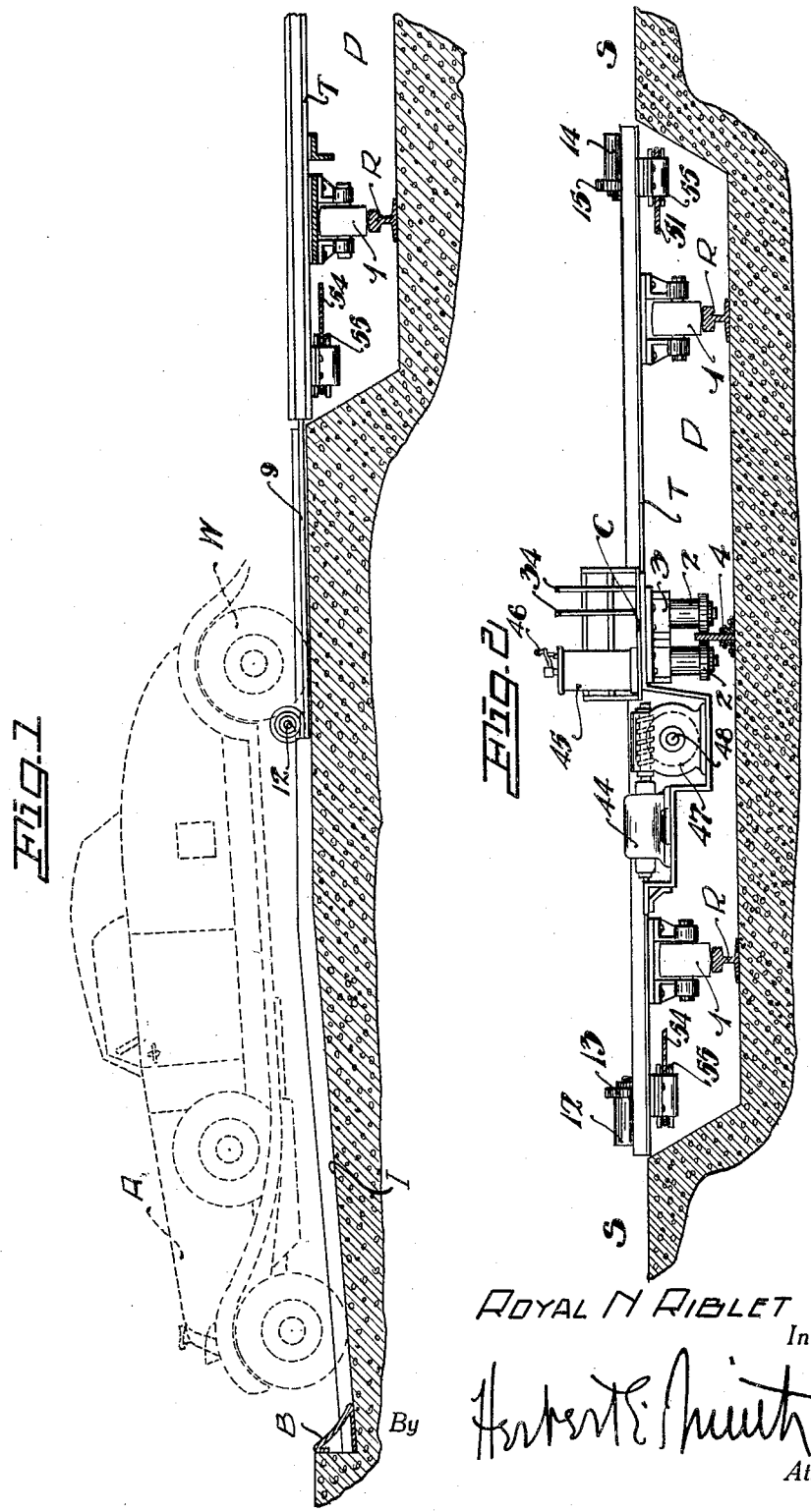
ROYAL N RIBLET
Inventor
By Herbert E. Smith
Attorney

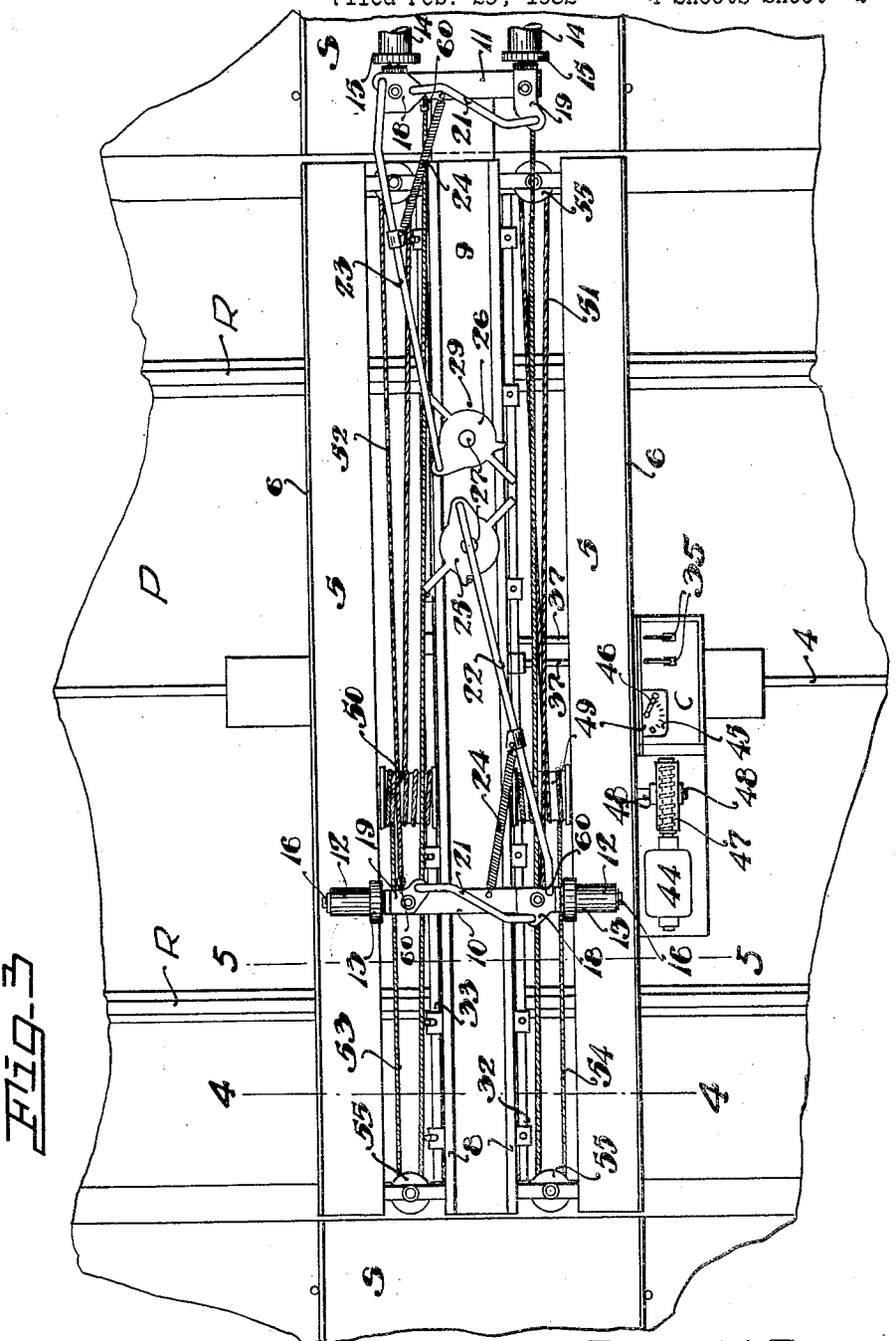

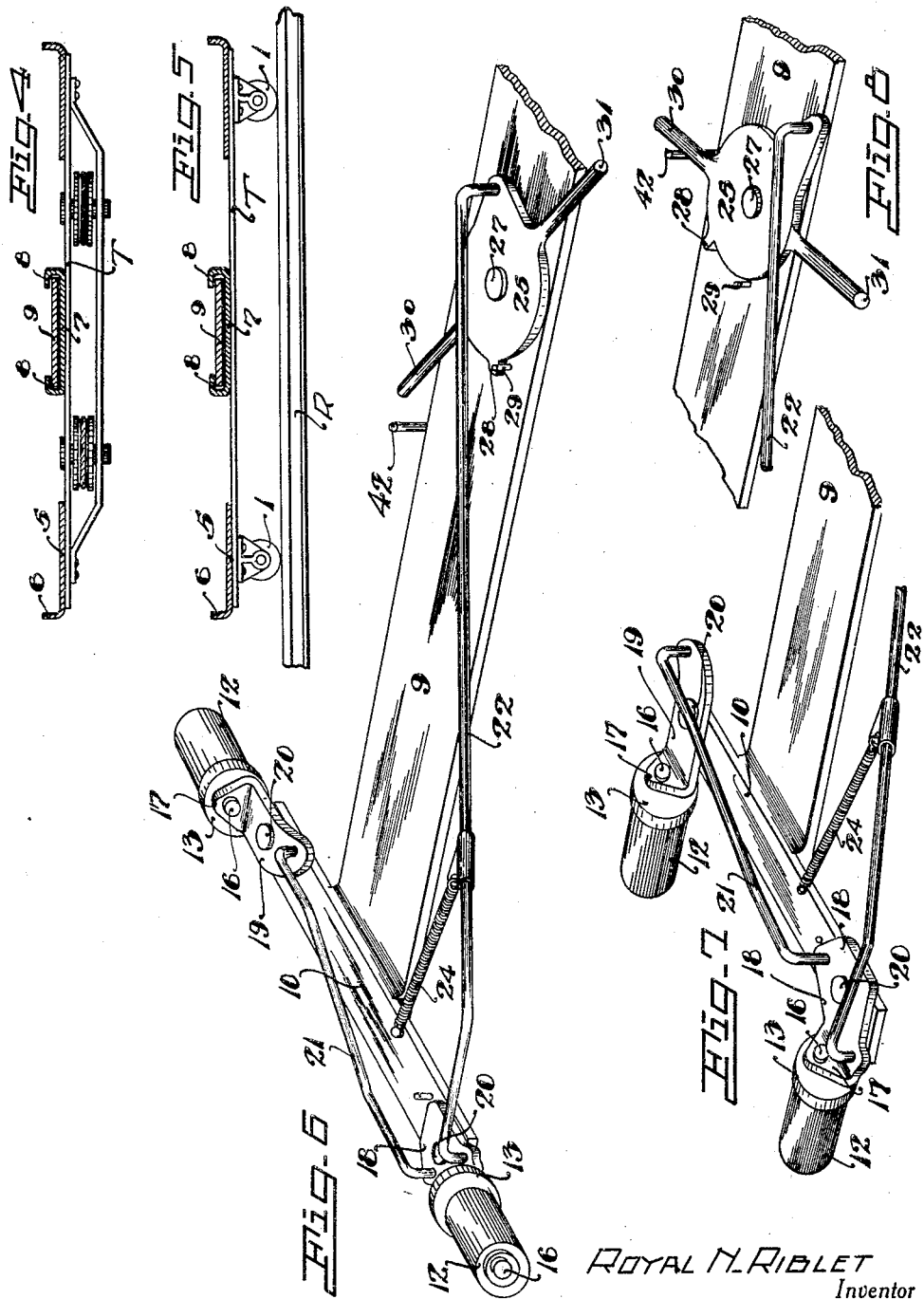

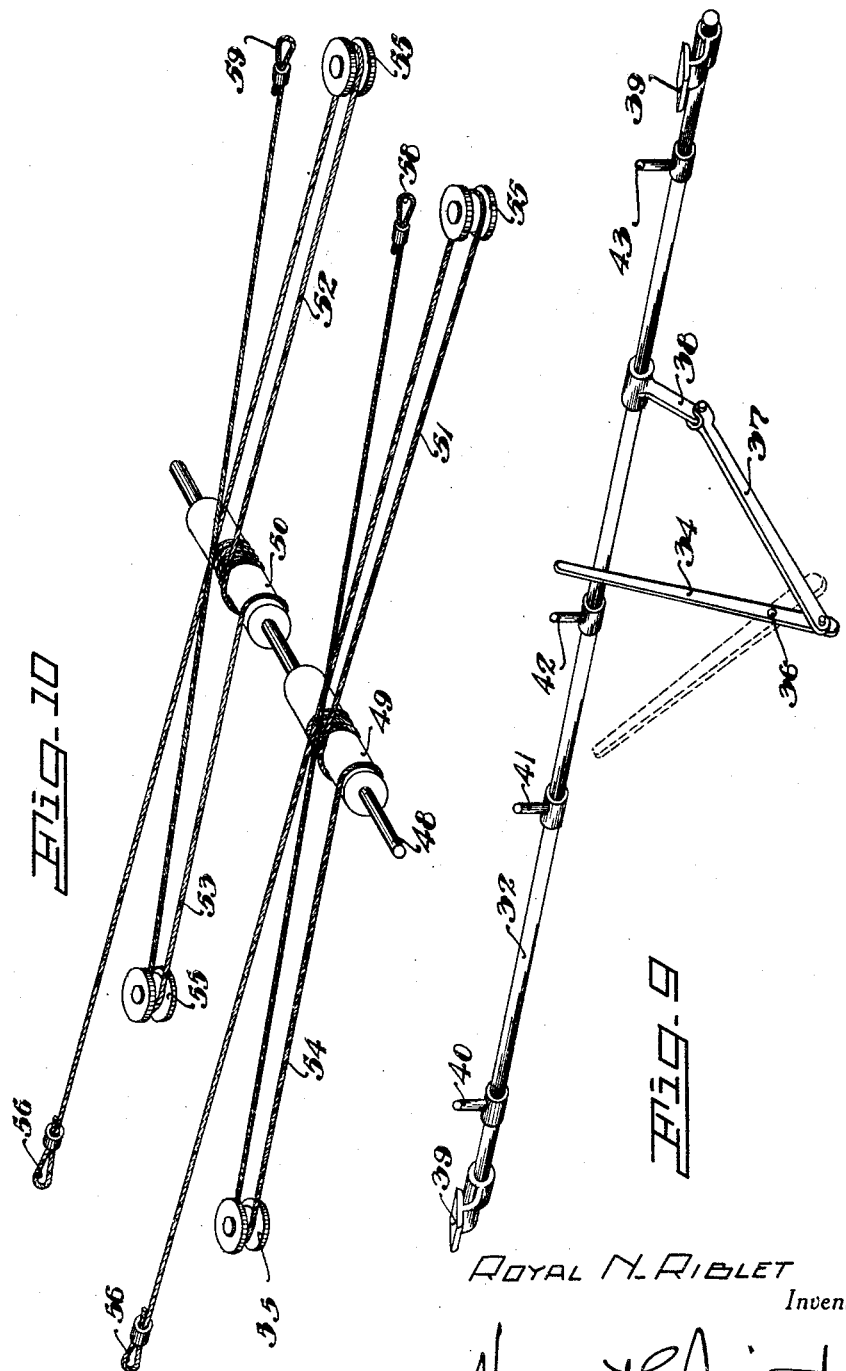

Patented Nov. 8, 1932

1,886,588

UNITED STATES PATENT OFFICE

ROYAL N. RIBLET, OF SPOKANE, WASHINGTON

TRANSFER TRUCK

Application filed February 29, 1932. Serial No. 595,873.

My present invention relates to improvements in transfer trucks or conveyers, adapted especially for use in handling automobiles or automatic vehicles as they are being received into, and discharged from, a storage garage or other space adapted to accommodate a number of such vehicles.

The transfer truck of my invention is of the wheeled type, traveling on spaced rails, or a track, and propelled by suitable power, between two rows of stalls or storage spaces, as in a garage, and the truck is equipped with mechanism, operating transversely of the truck rails whereby the automobile may be either pushed from the truck to its storage space, or pulled on the truck from its storage space, at either side of the truck.

An electric motor is mounted on the truck to furnish the power to operate the push-pull mechanism, or transfer mechanism, and suitable control devices or levers are mounted on the truck, readily accessible to an operator who rides on the truck, for operation and control of the transfer or push-pull mechanism.

The invention consists in certain novel combinations and arrangements of parts, whereby the automobiles may be handled with convenience and dispatch when going into, or out of storage, as will hereinafter be more fully set forth.

In the accompanying drawings I have illustrated one complete example of the physical embodiment of my invention, wherein the parts are combined and arranged according to the best mode I have thus far devised for the practical application of the principles of my invention, but it will be understood that various changes and alterations may be made in the exemplifying structure without departing from the principles of my invention.

Figure 1 is a vertical sectional detail view showing a part of the flooring of a garage, or storage space for automobiles, a portion of the transfer truck embodied in my invention, and also showing, by dotted lines, a stored automobile, ready to be pulled from its storage space to the transfer truck.

Figure 2 is a sectional detail view showing the pit for the depressed railway tracks of the conveyer system for the storage of automobiles, and showing one of the transfer trucks on the railway tracks.

Figure 3 is a top plan view of a transfer truck having duplex push-pull apparatus for an automobile, with one of the duplex devices extended to active position, and the other retracted to inactive position.

Figure 4 is a detail sectional view at line 4—4 of Figure 3.

Figure 5 is a detail sectional view at line 5—5 of Figure 3.

Figure 6 is a perspective view showing one of the duplex push-pull devices in extended, active position.

Figure 7 is a view similar to Figure 6, with the push-pull device in inactive position.

Figure 8 is a detail perspective view of one of the automatic trips for a push-pull device.

Figure 9 is a perspective view of one of the actuating or rock-shafts of the trips.

Figure 10 is a perspective view showing the cable arrangement for the duplex, push-pull device.

In order that the utility, the general arrangement, and the relation of parts, may readily be understood, I have shown in Figures 1, 2, and 3, a pit P in the floor of a garage or storage space, having depressed railway rails R, R, spaced apart for the transfer truck T to roll over. The automobile A is to be withdrawn from its storage space S, as indicated in Figure 1, and transferred to the truck T. The storage spaces preferably have an incline I in the floor, which incline terminates at the bumper B, and when an automobile is discharged from the truck T to its space S the forward pair of wheels of the automobile run down the incline to properly locate the automobile, and also to prevent accidental coasting of the automobile from its storing space S.

The transfer trucks T may be used as a train of trucks for conveying automobiles to and from storing spaces, or the truck T may be used singly, and while I have not illustrated any means for propelling the transfer truck or trucks, it will be understood that suitable means are provided for this purpose.

The automobile A may be pulled from the left, as in Figure 1 to the transfer truck, or it may be pulled from the right side of the pit onto a truck, when the automobile is to be withdrawn from storage, for delivery. When the automobile is received at the storage place, it may be driven directly onto the transfer truck, the truck conveys the automobile to a suitable storage space S, at either side of the pit P, and then the automobile is pushed from the truck into its space S, the forward wheels rolling down the incline I, and the movement of the automobile is stopped by contact of the forward wheels with the bumper B.

Thus the truck T may be propelled in suitable manner, with its wheels 1 rolling on the track or rails R, to the desired location and the automobile carried by the truck may then be pushed to a selected side of the truck, or when the automobile is to be discharged from storage, it is pulled onto the truck, from either side of the truck, and then conveyed to the exit of the storage building or garage.

In Figures 2 and 3 the depressed railway system for the truck is shown as provided with means to prevent lateral displacement of the plane wheels or rollers 1, 1, from the rails R, and as indicated in Figure 2 a pair of opposed, spaced rollers 2, 2, are supported beneath the truck in brackets 3, in order that the guide rollers 2 may run on the opposite, vertical faces, of a fixed, vertical, flat rail 4, centrally located between the rails R and disposed parallel therewith.

On the top of the truck T, I arrange two spaced, parallel plates 5, 5, having at their outer sides or edges guide flanges 6, which plates form the tracks or ways for the four wheels of the automobile. The ways are of suitable width to accommodate the tires of the automobile, and they are spaced apart to coincide with the standard gage of automobiles, and of course, these ways extend transversely of the rails R, R, and are of suitable length to accommodate the maximum length of cars or automobiles. The ways or tracks extend the full width of the truck and entirely across the pit P, and they are supported in suitable manner on the truck.

Between these two flanged plates or ways 5, 5, a third, channel plate 7, is secured on the top of the truck, and provided with side flanges 8, 8, that are inturned as shown, the channel plate or guide being located centrally between the two track plates or ways 5, 5.

Within the guide or channel plate a slide plate 9 is adapted to reciprocate longitudinally, the inturned flanges 8, 8, forming guide grooves for the edges of the plate to prevent lateral movement of the slide plate. This slide plate is the operating member of the duplex, push-pull device for the automobile, and as shown at Figures 5 and 7 especially, the slide plate is fashioned at its opposite ends with cross-heads 10 and 11.

On each cross head are mounted two push-pull rollers 12, 12 and 14, 14, and two traction rollers 13, 13 and 15, 15, in each of the four cases a push-pull roller and a traction roller being loosely journaled on a non-rotary axle 16. The pair of rollers 12, 12 and the pair of rollers 14, 14 are adapted for alternate use in frictional contact with a pair of wheels, or tires, of the automobile, and these push-pull rollers may engage the tires at the rear of the wheels when the automobile is to be pulled onto the truck, or the push-pull rollers may engage the fronts of the tires of the automobile wheels when the automobile is to be pushed off of the truck, at either side of the truck. The traction rollers 13, 13, and 15, 15, are larger in diameter than the push-pull rollers, and, due to the fact that the push-pull rollers engage the tread of the tire below the axis or journal of the wheel of the automobile, as indicated in Figure 1, these traction rollers 13, 13, or 15, 15, roll on the floor of the garage, and are thus stabilized in their movement and also form rolling supports for the push-pull rollers.

As the automobile is pushed or pulled, the push-pull rollers in frictional engagement with the treads of the wheels W, roll on the treads of the revolving wheels W thus providing a smooth and easy transmission of power with slight friction, and it will also be apparent that no part of the automobile is marred or scratched in the pushing or pulling operations, for the reason that the operating device contacts only with the treads of the wheel-tires.

The axles 16, and their rollers 12, 13, 14, 15 loosely journaled on the axles, are mounted on the cross heads at the opposite ends of the slide plate or operating member 9, through the use of upright flanges 17 on the lever plates 17 and 18. One of these lever plates is pivoted at 20 at each end of each cross head, and the complementary pivoted plates mounted on each cross head are connected by a cross rod or connecting rod 21 pivotally connected at its ends to the lever plates.

This mounting of the push-pull rollers and traction rollers at the opposite ends of the slide plate 9 permits the pair of push-pull rollers at each end of the slide plate to be turned to alined position, transversely of the slide plate as in Figure 6, or permits the same pair of rollers to be turned to parallel position and parallel with the longitudinal axis of the slide plate as in Figure 7.

Thus, in the inactive position of Figure 7 the push-pull rollers may be projected under the rear end of the automobile between its rear wheels W, and, after the push-pull rollers have passed the front of the rear wheels W, the push-pull rollers may be extended to active position of Figure 6 to engage the treads of the wheels W as in Figure 1. In this position the rollers 12, 12 are adapted to pull the automobile A onto the truck T.

After the automobile has been pulled onto the truck, the rollers 12, 12 may be turned from alined position to parallel position, and thus be withdrawn from under the rear end of the automobile. After the truck has conveyed the automobile to a desired discharge point, these same rollers 12, 12 may be again turned to alined position, and then projected against the rear treads of the wheels W, whereupon the slide plate is projected to push the automobile from the truck.

Thus it will be apparent that the slide plate or operating member 9 is adapted to be reciprocated laterally of the truck and transversely of the rails R, R for alternate use of the duplex push-pull devices, and that both of the devices are adapted to push an automobile from the truck, or pull an automobile onto the truck, all of which operations are under control of an operator standing on the control platform C, as shown in Figures 2 and 3.

The pairs of lever plates 18 and 19, forming the mounts for the rollers at the opposite ends of the slide 9, are operated through the instrumentality of the respective links 22 and 23, and these links are connected to adjacent cross heads by springs 24. The outer end of each link is pivoted to a lever-plate, as 18, and the inner end of each link is connected to or pivoted on a rotary disk as 25 and 26, located at opposite sides of the approximate center of the slide, and pivoted on the top of the slide at 27. Each disk is designed to have a rotary movement on its pivot that is limited by the co-action of abutment 28 on the periphery of the disk and a pin 29 mounted on the top face of the slide in the path of movement of the abutment, and each disk is fashioned with a pair of diametrically arranged arms 30 and 31 which operate as trip arms by means of which the disks are turned. As will be apparent the turning of the disks in alternate directions is for the purpose of swinging the push-pull rollers from active position of Figure 5 to inactive position of Figure 7, and vice versa.

A clockwise turn of the disk 25 in Figure 6 swings the push-pull rollers to inactive position, and an anti-clockwise turn of the disk in Figure 8 causes the inactive rollers of Figure 7 to swing to active position.

The disks are thus adapted to be turned in alternately opposite directions, through the alternate co-action of the two lever arms 30 and 31 as the latter arms are moved with the slide laterally of the truck.

The means for controlling the operation, or swinging movement, of the push-pull rollers to active position and inactive position, includes a pair of rock shafts 32 and 33; a pair of hand levers 34 and 35 pivoted at 36 in suitable bearings on the control platform C and readily accessible to the operator of the truck; and links 37 that are pivotally connected to the manual levers 34 and 35, and to the crank arms 38, one of which arms is rigid with each shaft 32 and 33.

These rock shafts 32 and 33 are journaled in bearings 39 on the top of the truck, and the shafts are disposed at the sides of the center guide way 7 of the slide 9, the shafts as shown extending approximately the full width of the truck. Each rock shaft is provided with four fixed, radially extending pins 40, 41, 42, and 43 forming detents, eight in number, capable of co-action with the two lever arms 30, 31 of the two rotary disks 25, 26. By means of the manual levers 34 and 35 the rock shafts may be turned to bring these detents from horizontal position to vertical or upright position, and when in the latter position a detent may co-act with a lever arm of the rotary disks.

Thus, in Figure 6, with the rollers 12, 12 in active position to pull the automobile A of Figure 1 onto the truck T, after the slide 9 has pulled the automobile onto the truck, it becomes necessary to swing the rollers 12, 12, to inactive position in order that the automobile may be driven, or rolled, off of the truck. This swinging of the rollers 12, 12, to inactive position is accomplished as the slide 9 moves to the right in Figure 6 and when the lever arm 31 contacts with one of the upright pins, as 42 on the rock shaft 32, which shaft has previously been rocked to bring the pins to upright position by manipulation of the manual lever 34. When the lever arm 31 strikes the pin 42 the rotary disk 25 is partially turned, thereby projecting the link 22 to the left in Figure 6, thus causing the two roller-mounts 18 and 19 to swing on their pivots, and bring the rollers to inactive position of Figure 7.

A sufficient number of pins or detents are employed on each rock shaft, and the detents are properly spaced apart on the shafts, to co-act at the proper time with one of the four lever arms of the rotary disks, for the purpose of tripping the roller-swinging mechanisms for alternate movement at the ends of the slide 9, to bring the rollers alternately to active and inactive positions.

An electric motor 44 forms the prime mover for the reciprocating movement of the slide 9, and a control box 45 and control lever 46 are shown in position for ready access by the operator who may thus control the motor 44 for forward drive, or for reverse drive, depending on the desired direction in which the slide 9 is to be moved.

Suitable transmission mechanism, as a worn-drive 47, transmits power from the motor to an operating shaft 48 that is journaled in suitable bearings on the truck beneath the tracks 5, 5, and the guide-way 7, and this shaft, as shown is arranged parallel with the rails R, R, or transversely of the tracks 5, 5.

On the shaft, and adapted to revolve therewith, are mounted two drums 49 and 50, and four cables 51, 52, 53, and 54, each have an end attached to a drum. The cables 51 and 54 have their inner ends attached to the drum 49 and they are coiled on the drum so that one cable is wound while the other cable is unwound; while the cables 52 and 53 have their inner ends secured to the drum 50 in such manner that one cable is wound as the other cable is unwound, and vice versa.

Each cable passes from its drum around a guide pulley 55 journaled in bearings on the underside of the truck, and thence from this pulley the cable returns, across and to the other side of the drum, and the ends 56, 57 of cables 51, 52, respectively are anchored to cross head 10, while the ends 58 and 59 of cables 54 and 53 respectively are anchored to cross head 11 of the slide 9, as at 60.

Thus, it will be apparent that two cables are employed to pull the slide in each direction, and as the motor revolves the shaft 48 and drums 49, 50, clockwise in Figure 10, the pair of cables 53 and 54 will be wound on the respective drums 50 and 49, to pull the slide to the left, and at the same time the cables 51 and 52 are unwound from the drums 49 and 50 to permit this movement. When the rotary movement of the shaft 48 is reversed, through a reverse drive from the motor 44, and the drums revolve anti-clockwise, the unwound cables are wound on the drums and the wound cables are unwound from the drums as the slide is moved to the right in Figure 10.

With a skillful operator standing on the control platform C, he may with dexterity manipulate the control lever of the electric motor, and the two manual control levers 34 and 35, at the proper times, to insure a smooth operation of the slide and of the push-pull rollers for easy and quick handling of the automobile whether the latter is being stored in its space S or being withdrawn therefrom for use, and it will of course be understood that the truck is moved along on its tracks or rails R, R, to convey successive cars or automobiles into and out of the garage.

Having thus fully described my invention, what I claim as new and desire to secure by Letters Patent is:—

1. A vehicle-transfer apparatus comprising guiding means and a reciprocable member combined with said means, means for operating said member, propelling means pivotally mounted on said member for engagement with the vehicle, and mechanical actuating means responsive to the movement of said member for pivotally moving the propelling means alternately to active position and to inactive position.

2. The combination with a vehicle-conveyer, of a reciprocable member mounted thereon and operating means for said member, propelling means pivotally mounted on said member for engagement with a vehicle, and mechanical actuating means responsive to the movement of said member for pivotally moving the propelling means alternately to active and inactive position.

3. The combination with a vehicle-conveyer, of an actuating member movable thereon and means for moving said member, propelling means pivotally mounted on the actuating member, and mechanical actuating means responsive to the movement of said member for pivotally translating the propelling means from inactive position to active position.

4. A vehicle-transfer apparatus comprising a movable actuating member and operating means therefor, propelling means pivotally mounted on said actuating member, and mechanical actuating means responsive to the movement of said member for pivotally translating the propelling means from inactive position to active position.

5. The combination with a wheeled-truck of the railway type and a guide thereon, of a reciprocable member and operating means therefor, duplex propelling means pivotally mounted on said member, and mechanical actuating means responsive to the movement of said member for pivotally translating one of said duplex propelling means from inactive position to active position.

6. The combination with a vehicle conveyer having a guide mounted thereon, of a reciprocable slide in said guide and means on the conveyer for operating the slide, duplex, retractible propelling means mounted on the opposite ends of said slide, and selectable means responsive to the movement of the slide for translating said propelling means from retracted to active position.

7. In a vehicle-propelling apparatus, the combination with a reciprocable slide and operating means therefor, of a pair of roller-mounts pivoted on said slide and a connecting rod between said mounts, propelling-rollers journaled on said mounts, and means responsive to the movement of the slide for pivotally translating said rollers and mounts from inactive position to active position.

8. In a vehicle-propelling apparatus, the combination with a reciprocable slide and operating means therefor, of a pair of adjustable roller-mounts pivotally supported on the slide and a connecting rod between said mounts, propelling-rollers journaled on said mounts, and means for pivotally adjusting said roller-mounts from inactive position to active position.

9. In a vehicle propelling apparatus, the combination with a reciprocable slide and operating means therefor, of a pair of pivoted roller-mounts and an operative connection therebetween, a propelling roller and a traction roller journaled on each mount, and means for moving said mounts to swing the propelling rollers from inactive position to active position.

10. In a vehicle propelling apparatus, the combination with a reciprocable slide and operating means therefor, of a pair of roller mounts pivoted on said slide and a connecting rod therebetween, propelling rollers journaled on said mounts, and means responsive to the movement of the slide for pivotally moving said roller-mounts from inactive position to active position.

11. In a vehicle propelling apparatus, the combination with a reciprocable slide, operating means for the slide, and retractible propelling means mounted on the slide, of means mounted on the slide for moving the propelling means from retracted position to active position, and means in the path of movement of the means for moving the propelling means for actuating the latter.

12. In a vehicle propelling apparatus, the combination with a reciprocable slide, operating means for the slide, and retractible propelling means mounted on the slide, of control means mounted on the slide and connected with the propelling means, and means in the path of movement of the control means for actuating the latter means.

13. In a vehicle propelling apparatus, the combination with a reciprocable slide, operating means for the slide, and retractible propelling means mounted on the slide, of a pivoted control member mounted on the slide and connected with the propelling means, a lever arm on the control member, and a stationary detent in the path of said arm for actuating the control member.

14. In a vehicle propelling apparatus, the combination with a reciprocable slide, of a shaft and operating means therefor, a drum mounted on the shaft, a pair of cables adapted to wind in opposite directions on said drum, a guide pulley for each cable for directing a cable across the drum, and said cables having their opposite, outer ends connected to the ends of the slide.

In testimony whereof I affix my signature.

ROYAL N. RIBLET.